United States Patent
Doganis (10) Patent No.: US 10,453,218 B2
(45) Date of Patent: Oct. 22, 2019

(54) DYNAMICAL CAMERA CALIBRATION

(71) Applicant: Dassault Systemes, Velizy Villacoublay (FR)

(72) Inventor: Fivos Doganis, Yerres (FR)

(73) Assignee: Dassault Systemes, Velizy Villacoublay (FR)

( * ) Notice: Subject to any disclaimer, the term of this patent is extended or adjusted under 35 U.S.C. 154(b) by 0 days.

(21) Appl. No.: 15/605,659

(22) Filed: May 25, 2017

(65) Prior Publication Data
US 2017/0372492 A1 Dec. 28, 2017

(30) Foreign Application Priority Data
Jun. 28, 2016 (EP) ..................... 16305778

(51) Int. Cl.
*G06T 7/70* (2017.01)
*G06T 7/80* (2017.01)
(Continued)

(52) U.S. Cl.
CPC .................. *G06T 7/80* (2017.01); *G06T 7/70* (2017.01); *H04N 5/23293* (2013.01); *H04N 17/002* (2013.01); *G06T 2207/10016* (2013.01); *G06T 2207/30208* (2013.01); *G06T 2207/30244* (2013.01)

(58) Field of Classification Search
CPC ...... H04N 17/00; H04N 17/002; H04N 17/02; H04N 5/222; G06T 7/80; G06T 7/81; G06T 7/82; G06T 7/83; G06T 7/84; G06T 7/85; G03B 43/00; G03B 43/02; G02B 7/003; G02B 7/004; G02B 7/005

USPC ....... 348/188, 180, 181, 182, 187, 189, 190, 348/191, 164, 162, 137, 142, 135, 49, 50, 348/46, 207.1, 231.99, 231.1, 241, 247, 348/523, 567, 714, 719, 723; 382/154, 382/181, 190, 199, 216, 275
See application file for complete search history.

(56) References Cited

U.S. PATENT DOCUMENTS 5,850,472 A * 12/1998 Alston ..................... G01J 3/10
    382/162
6,527,395 B1 * 3/2003 Raskar ................... G03B 21/14
    353/70
(Continued)

OTHER PUBLICATIONS

Extended European Search Report from European Application No. 16305778.9, entitled: "Dynamical Camera Calibration," dated Nov. 22, 2016.
(Continued)

*Primary Examiner* — Brian P Yenke
(74) *Attorney, Agent, or Firm* — Hamilton, Brook, Smith & Reynolds, P.C.

(57) ABSTRACT

A computer-implemented method of calibrating a camera includes: a. making a video screen display a calibration pattern; b. acquiring from the camera a video stream of a scene comprising said calibration pattern; c. determining a modified calibration pattern depending on the acquired video stream, and making the screen display it; said steps a. to c. being iterated a plurality of times; and then d. estimating intrinsic calibration parameters of the camera by processing the acquired video streams. A computer program product, computer-readable data-storage medium and computer system for carrying out such a method.

16 Claims, 4 Drawing Sheets

(51) Int. Cl.
*H04N 5/232* (2006.01)
*H04N 17/02* (2006.01)
*H04N 17/00* (2006.01)

(56) References Cited

U.S. PATENT DOCUMENTS

| | | | |
|---|---|---|---|
| 8,106,968 B1 | 1/2012 | Rudin et al. | |
| 8,368,762 B1* | 2/2013 | Chen | H04N 17/002 |
| | | | 348/187 |
| 8,619,144 B1 | 12/2013 | Chang | |
| 8,662,676 B1 | 3/2014 | Chang et al. | |
| 9,319,666 B1* | 4/2016 | Lisin | G06T 7/80 |
| 9,338,447 B1 | 5/2016 | Crump et al. | |
| 9,489,735 B1* | 11/2016 | Reitmayr | G06T 7/80 |
| 9,519,954 B2* | 12/2016 | Shechtman | G06T 5/00 |
| 9,672,623 B2* | 6/2017 | Ghazizadeh | G06T 7/80 |
| 9,892,514 B2* | 2/2018 | Maguire | G06T 7/80 |
| 2004/0066454 A1* | 4/2004 | Otani | G01C 11/06 |
| | | | 348/188 |
| 2005/0261849 A1* | 11/2005 | Kochi | H04N 5/217 |
| | | | 702/85 |
| 2005/0286759 A1* | 12/2005 | Zitnick, III | G06T 15/205 |
| | | | 382/154 |
| 2007/0106482 A1* | 5/2007 | Zandifar | G09G 3/2092 |
| | | | 702/85 |
| 2008/0285854 A1* | 11/2008 | Kotake | G06T 7/73 |
| | | | 382/190 |
| 2008/0292131 A1* | 11/2008 | Takemoto | H04N 13/0246 |
| | | | 382/100 |
| 2009/0091623 A1* | 4/2009 | Krogstad | G03B 21/53 |
| | | | 348/189 |
| 2010/0201809 A1* | 8/2010 | Oyama | G01C 3/14 |
| | | | 348/135 |
| 2010/0259624 A1* | 10/2010 | Li | G06T 7/80 |
| | | | 348/187 |
| 2011/0090343 A1* | 4/2011 | Alt | G06T 19/006 |
| | | | 348/164 |
| 2011/0292178 A1* | 12/2011 | Goma | H04N 13/128 |
| | | | 348/46 |
| 2012/0050540 A1* | 3/2012 | Witt | H04N 13/0239 |
| | | | 348/175 |
| 2012/0069193 A1* | 3/2012 | Ramegowda | H04N 5/33 |
| | | | 348/164 |
| 2014/0285676 A1* | 9/2014 | Barreto | H04N 17/002 |
| | | | 348/187 |
| 2014/0354828 A1* | 12/2014 | Rubinstein | G06T 3/0068 |
| | | | 348/187 |
| 2015/0130951 A1* | 5/2015 | Olson | G06T 7/80 |
| | | | 348/184 |
| 2017/0053405 A1 | 2/2017 | Desai | |
| 2017/0228864 A1 | 8/2017 | Liu | |
| 2017/0242421 A1* | 8/2017 | Ghazizadeh | C12N 15/1065 |
| 2017/0287166 A1* | 10/2017 | Claveau | G06T 7/80 |
| 2017/0372491 A1 | 12/2017 | Doganis et al. | |

OTHER PUBLICATIONS

Zhang, Z., "Flexible Camera Calibration by Viewing a Plane From Unknown Orientations," Computer Vision, 1999. The Proceedings Of The Seventh IEEE International Conference On Kerkyra, Greece Sep. 20-27, 1999, Los Alamitos, CA, USA, IEEE Comput. Soc, US, vol. 1, Sep. 20, 1999 (Sep. 20, 1999), pp. 666-673, XP010350391, ISBN: 978-0-7695-0164-2.

* cited by examiner

DYNAMICAL CAMERA CALIBRATION

RELATED APPLICATION(S)

This application claims priority under 35 U.S.C. § 119 or 365 to Europe, Application No. 16305778.9, filed Jun. 28, 2016. The entire teachings of the above application(s) are incorporated herein by reference.

FIELD OF INVENTION

The invention relates to a computer-implemented method for calibrating a camera. More precisely, it relates to the "intrinsic" calibration of a digital camera, i.e. to the estimation of the parameters determining its optical response, including focal length(s), principal point and optionally distortion parameters.

The invention applies, for instance, to the field of Augmented Reality (AR), where 3D computer-generated images representing virtual objects are superposed on top of images captured by a video camera. To merge the virtual and the real images in the most realistic way, an accurate calibration of the video camera is required. Indeed, AR needs defining a virtual camera, which is used for rendering virtual 3D objects. This virtual camera must match as closely as possible the real camera used to capture the real world which is rendered in the background. Data provided by the manufacturer of the camera are usually insufficiently accurate to give satisfactory results, making it necessary to resort to calibration.

BACKGROUND

Camera calibration is all about accuracy. Without a well-calibrated camera, the rendered objects will not look as if they were real and the User Experience will be ruined.

Augmented Reality is a particular demanding application, but not the only one requiring accurate camera calibration. Other applications include, for instance, 3D volume reconstructions, in which case the camera is often a depth camera.

SUMMARY

The invention is not limited to one or several specific applications; it may be useful whenever accurate calibration of a video camera is required.

The most widespread technique used to perform camera calibration is known as Zhang's algorithm and is described in the paper by Z. Zhang "A Flexible New Technique for Camera Calibration." IEEE Transactions on Pattern Analysis and Machine Intelligence. Vol. 22, No. 11, 2000, pp. 1330-1334).

To calibrate a camera using this technique, a user must:

1. Print a calibration pattern (typically a regular array of black and white elements), using a laser printer;
2. Measure the printed pattern to ensure its size has not been scaled by the printer;
3. Glue the pattern on a rigid surface such as rigid cardboard, a piece of wood or, even better, glass, ensuring that the pattern remains straight (e.g. by checking that there are no air bubbles between the paper and the pattern);
4. Position the pattern in front of the camera and move it around to change its orientation and position;
5. Capture images corresponding to several different positions and orientations ("poses") of the pattern; and
6. Process the images according to a mathematical algorithm described in detail in the above-referenced paper.

The processing step, by itself, can be easily carried out using existing software but the previous steps are cumbersome, which make the whole process unpractical.

First of all, it is tedious to perform steps 1, 2 and 3 properly, and the user has to be very careful during the creation of the calibration pattern to maximize the accuracy of the whole calibration process. To overcome this difficulty, it has been suggested to use a calibration pattern displayed on a LCD (Liquid Crystal Display); see e.g. Zhan, Z. (2008). Camera Calibration Based on Liquid Crystal Display (LCD). The International Archives of the Photogrammetry. Remote Sensing and Spatial Information Sciences, 37.

Most importantly, steps 4 and 5 are often time-consuming and frustrating because the calibration program performing step 6 typically rejects a large share of the acquired images, whose quality turns out to be insufficient. This may be due to an ill-chosen positioning of the pattern with respect to the camera. For instance:

The pattern may be too far from the camera, in which case its elements may be too small to be detected.

It may be too close to the camera, or too deported toward the edges of the field of view, in which case it may not be entirely visible. Moreover, if the pattern is very close to the cameras, its elements appear to be unnecessary large and spaced, making the pattern sub-optimal for the purpose of calibration.

It may also be out-of-focus, and therefore blurred, or insufficiently visible due to poor lighting.

Document U.S. Pat. No. 8,106,968 also describes a method of calibrating a camera by detecting distortions in a plurality of images of a pattern.

The problem of partial visibility can be solved using special patterns, wherein at least some elements have unique features allowing their identification—e.g. the so-called "ChArUco" patterns, see http://docs.opencv.org/3.1.0/da/d13/tutorial_aruco_calibration.html#gsc.tab=0.

However, there is no known method to deal with the other inconveniences associated with an inappropriate positioning of the pattern—except taking additional images to replace the discarded ones, which is both time-consuming and frustrating.

The invention aims at overcoming the aforementioned drawbacks of the prior art. More particularly, it aims at reducing the share of calibration images which are discarded due to an inappropriate positioning of the calibration pattern in the field of view of the camera to be calibrated, and preferably also at maximizing the amount of useful information extracted by each valid calibration image.

According to the invention, this aim is achieved by performing the calibration using a dynamical, adaptive calibration pattern displayed on a screen. "Dynamical" means that the pattern changes during the calibration process, unlike a "static" pattern printed on a sheet of paper. "Adaptive" means that a computer system analyzes the images of the calibration pattern taken by the camera to be calibrated and, if necessary, drives the screen so as to modify the pattern. For instance, the computer system may determine that the screen is too far from the camera and, as a response, modify the pattern to make it more easily detected (e.g. using larger and more widely spaced pattern elements). Or, on the opposite, it may determine that the screen is very near to the camera and change the pattern by making it finer and denser, so as to maximize the amount of usable information provided to the calibration algorithm. If the pattern is only partially visible, the appearance of some element may change so as to allow them to be identified unambiguously. The use of an adaptive pattern reduces the share of images that have to be discarded, therefore speeding-up calibration and making the process less tedious and frustrating for the user.

An object of the present invention is then a computer-implemented method of calibrating a camera, comprising the steps of:

a. making a video screen display a calibration pattern;

b. acquiring from the camera a video stream of a scene comprising said calibration pattern;

c. determining a modified calibration pattern depending on the acquired video stream, and making the screen display it (the modified calibration pattern);

said steps a. to c. being iterated a plurality of times; and then d. estimating intrinsic calibration parameters of the camera by processing the acquired video streams.

According to particular embodiments of such a method:

Step c. may comprise the sub-steps of:

c1. determining, from said video stream, an estimated distance between the camera and the video screen displaying the calibration pattern;

c2. determining a modified calibration pattern as a function of said estimated distance.

The calibration pattern may comprise a periodic arrangement of elements characterized by at least an element size and a spatial period, said element size being smaller than said spatial period, and step c. may comprise:

c3. iteratively modifying said calibration pattern to minimize said spatial period under a constraint of detectability of the pattern in the video stream.

A calibration pattern may be formed by periodic arrangements of elements and characterized by at least an element size and a spatial period, and step c. may comprise the sub-steps of:

c-i. determining, from said video stream, an estimated distance between the camera and the video screen displaying the calibration pattern; then if the estimated distance is greater than a threshold:

c-ii. making the screen display a pattern characterized by a largest element size and a largest spatial period; and c-iii. making the screen display successively patterns of decreasing element size and spatial period until one of them is not detectable;

if the estimated distance is lower than a threshold:

c-iv. making the screen display a pattern characterized by a smallest element size and a smallest spatial period;

c-v. checking whether said pattern is detectable; and c-vi. if not, making the screen display successively patterns of increasing element size and spatial period until one of them is detectable.

Said estimated distance between the camera and the video screen displaying the calibration pattern may be determined by computing an area of the calibration pattern in the video sequence and deducing the estimated distance from said area.

The method may further comprise a step of determining if an image of the calibration pattern is detectable in the video stream and, if not, making the screen display a specific pattern, different and more easily detectable than a calibration pattern.

The method may further comprise a step of determining if only part of the calibration pattern is visible in the video stream and, in this case, modifying said pattern by introducing a plurality of pattern elements having a unique appearance.

The method may further comprise step of making an auxiliary screen display the acquired video stream.

Another object of the invention is a computer program product, stored on a computer-readable data-storage medium, comprising computer-executable instructions to cause a computer system to carry out such a method.

Another object of the invention is a computer-readable data-storage medium containing computer-executable instructions to cause a computer system to carry out such a method.

Yet another object of the invention is a computer system comprising a processor coupled to a memory and a graphical user interface, the memory storing computer-executable instructions to cause the computer system to carry out such a method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, which show.

DETAILED DESCRIPTION

A description of example embodiments follows.

Figure 1:
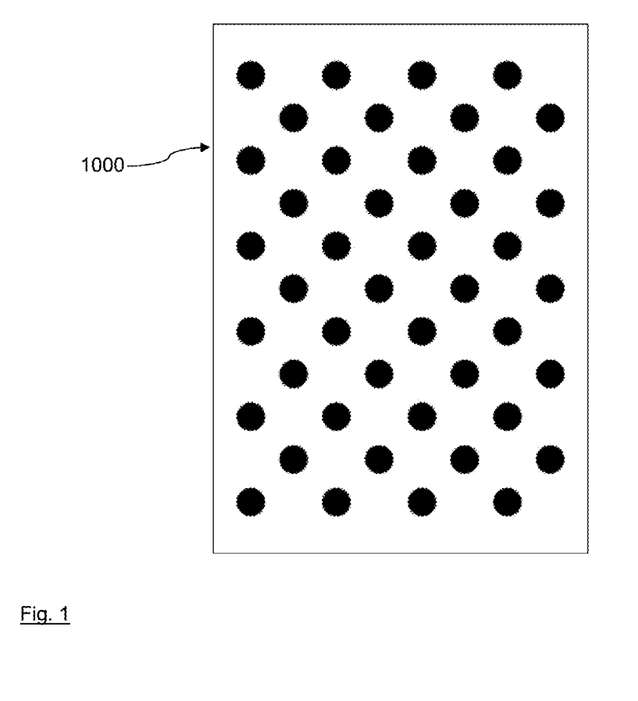
FIG. 1, a calibration pattern known from the prior art.

FIG. 1 shows a calibration pattern 1000 formed by a regular array of black disks on a white background. Other patterns may be used for carrying out the invention, for instance chessboards or grids, but this one turns out to be particularly advantageous as it provides the best accuracy with a minimal number of poses, see A. Datta et al. "Accurate Camera Calibration using Iterative Refinement of Control Points" IEEE 12th International Conference on Computer Vision Workshops (ICCV Workshops), 2009. This pattern is displayed by a screen 100, such as a liquid crystal display.

Figure 2:
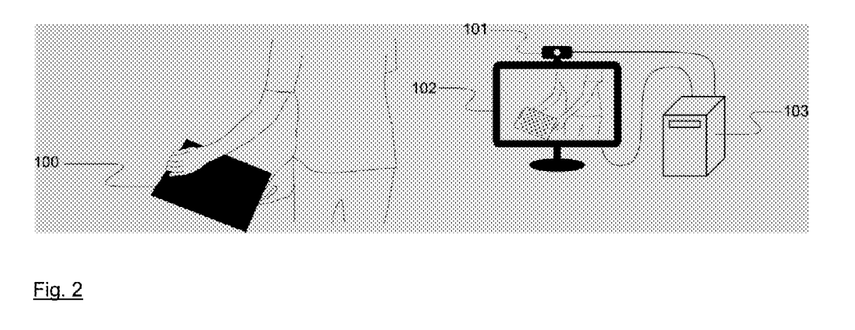
FIG. 2, the implementation of a method according to an embodiment of the invention.

FIG. 2 shows a camera 101 to be calibrated, connected to a computer 103, programmed to carry out the inventive calibration method. Camera 101 is typically a standard RGB (Red-Green-Blue) camera, but it may also be e.g. a RGB-Depth camera. Camera 101 acquires a series of images, and converts them to a digital video stream. Then, computer 103 acquires the video stream from the camera.

Computer 103 is provided with a monitor, or auxiliary screen 102, which displays the video flow generated by the camera; this is not absolutely necessary to carry out the inventive method, but is strongly preferred. The screen 100 used to display the dynamic and adaptive calibration pattern is part of a hand-held device 104, such as a tablet computer. A user carries this hand-held device and moves it within the visual field of camera 101, helped by the visual feedback provided by monitor 102. Computer 103 extracts a series of images from the video stream generated by the camera 101 and feeds them to the calibration algorithm. This extraction may be performed automatically by the computer, e.g. at fixed times, or may be triggered by a user e.g. by pressing a key of a keyboard connected to the computer 103. Moreover, computer 103 controls the displaying of pattern 1000 by the screen 100 of the hand-held device 104. In other words, computer 103 acts as a "master" and device 104 as a "slave".

Alternatively, the screen 100 displaying the calibration pattern may be fixed, and the camera being moved around while remaining connected to the computer through a wireless communication link. Also, the device 104 carrying the screen 100 could be the master and computer 103 the slave, or both devices may be slaved to another computer. It is also possible to use a screen 100 which is directly driven by computer 103.

In the following description of the invention, only the case of a screen 100 carried by a hand-held slave device 104 and a fixed camera 101 will be considered, but generalization to alternative embodiments is straightforward.

Figure 3:
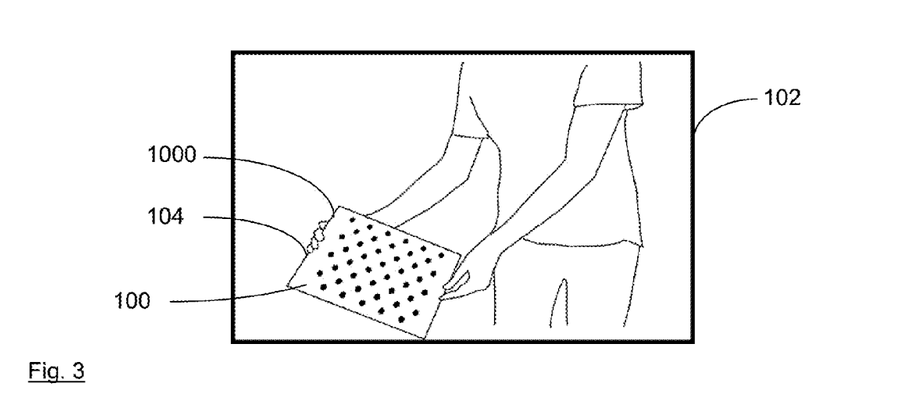
FIG. 3, an image acquired by the camera to be calibrated, showing a calibration pattern at an intermediate distance from the camera.

FIG. 3 represents an image acquired by camera 101 and displayed on monitor 102, showing the user holding the slave device 104, whose screen 100 displays the calibration pattern 1000 of FIG. 1. Screen 100 is held at a distance which may be qualified as "intermediate": the pattern is fully visible and occupies a significant portion of the field of view, and its elements are clearly distinguishable. The image is suitable to be used by the calibration algorithm. Which distances may be considered to be "intermediate" depends on the specific camera considered.

Figure 4A:
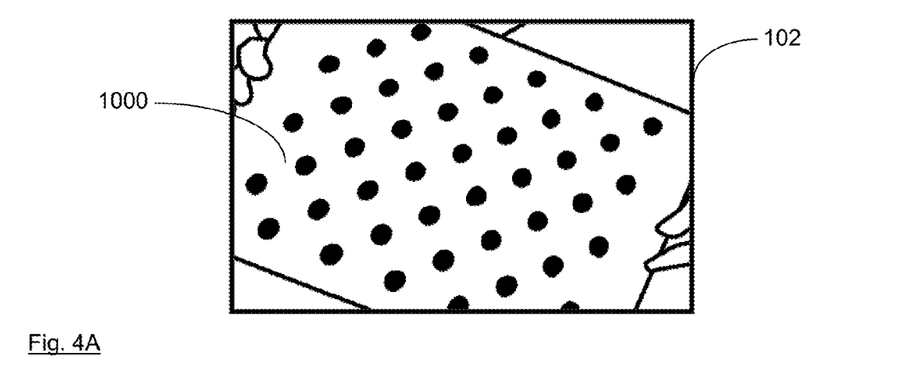
FIGS. 4A and 4B, two images acquired by the camera to be calibrated, showing a calibration pattern near to the camera, before (4A) and after (4B) a modification thereof.
Figure 4B:
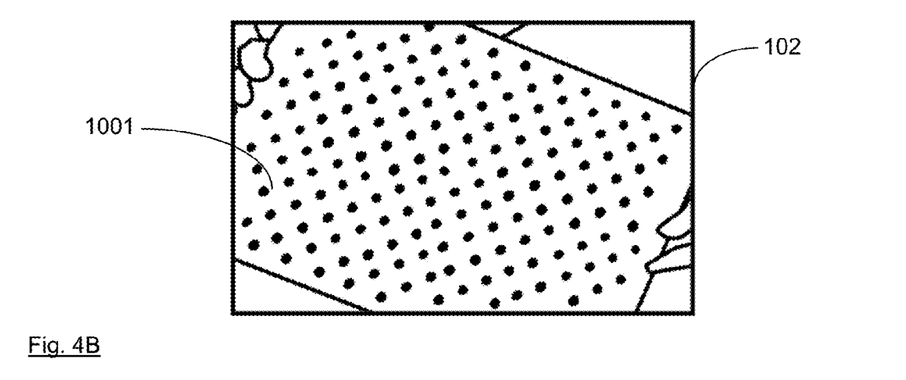

FIG. 4A shows a similar scene, wherein the screen 100 has been moved nearer to the camera. The pattern 1000 is not fully visible (some elements positioned at its corners are outside the field of view of the camera), and its elements are unnecessary large and widely spaced, which results in a waste of computation time by the calibration algorithm. The master computer 103 detects this sub-optimal situation and, as a response, it sends commands to the slave device to make it modify the calibration pattern to adapt to the short screen—camera distance. The result is illustrated on FIG. 4B. The modified pattern 1001 comprises a much greater number of much smaller elements (dots) with a shorter spatial period (i.e. spacing). Despite being smaller, the elements remain easily detectable; their larger number provides additional information to the calibration algorithm and makes the loss of some of them at the corners of the pattern much less detrimental.

Figure 6:
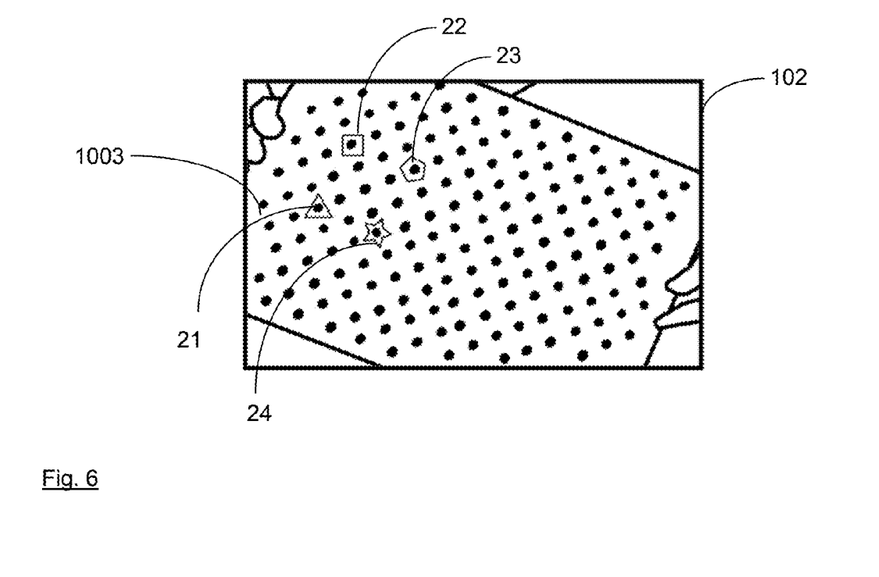
FIG. 6, an image acquired by the camera to be calibrated, showing a calibration pattern which is only partially visible, wherein some pattern elements are uniquely identified.

When the pattern is very close to the camera and a large number of elements is outside the field of view, the calibration algorithm becomes unable to identify its origin (the point of the pattern with respect to which the positions of all its elements are defined). The image is then unusable. In this case, the pattern may be modified by introducing a plurality of pattern elements having a unique appearance and a known position with respect to the origin. If these elements are visible on the image, they allow localizing the pattern origin and therefore using the image for calibration. FIG. 6 shows a modified pattern 1003 comprising three of these "unique" elements, which are identified by references 21, 22, 23 and 24. In the example, these elements are marked by a frame having a triangle, square, pentagon and star shape, but other alternatives exist. For instance, these elements may have a dynamic appearance—e.g. a changing color or size, or they may blink.

Figure 5A:
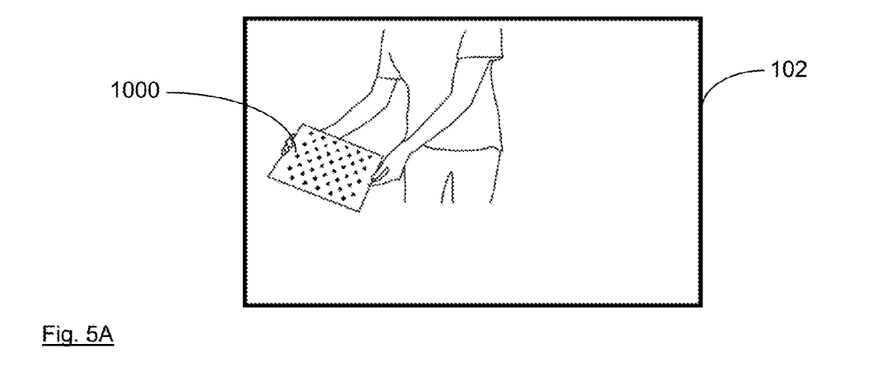
FIGS. 5A and 5B, two images acquired by the camera to be calibrated, showing a calibration pattern far from the camera, before (5A) and after (5B) a modification thereof.
Figure 5B:
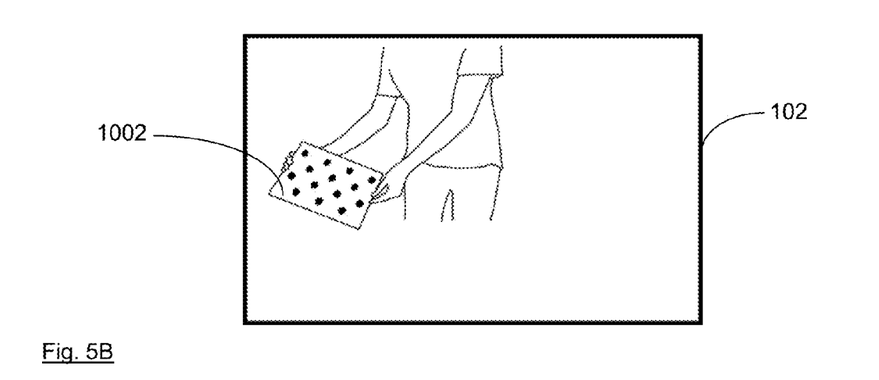

FIG. 5A illustrates the opposite situation, wherein the screen 100 has been moved far away from the camera. The elements of pattern 1000 appear too small and too close to each other; as a consequence the pattern is not easily detected and the acquired images may be unusable for calibration. The computer 103 detects this sub-optimal situation and, as a response, sends commands to the slave device to make it modify the calibration pattern to adapt to the short screen—camera distance. The result is illustrated on FIG. 5B. The modified pattern 1002 comprises a smaller number of larger elements (dots) with a longer spatial period (i.e. spacing). Being larger, the elements are more easily detectable, making the image usable for calibration—even if providing a somehow reduced amount of information.

A method according to an exemplary embodiment of the invention comprises the following steps:

The user launches a master program, run on the master computer 103, and a slave program, run on the slave device 104. The master program drives the camera 101, acquires the video flow, extracts the images, detects the pattern using conventional image-processing algorithms and sends commands to the slave device to modify the pattern displayed on screen 100 when necessary. The slave device is programmed to receive these commands and drives the screen 100 to display the required pattern. Each command may comprise an image file containing the pattern to be display, or an identifier of a calibration pattern chosen among a set of patterns stored in a memory element of the slave device, or instructions to modify (e.g. by zooming in or out) a "template" pattern.

A handshake is performed between the master and the slave to establish a communication channel between them. This communication can be unidirectional (from the master to the slave) or bidirectional, wired or wireless, leveraging, among others, Wi-Fi, Bluetooth, data over sound, or data over light, aka Li-Fi.

A calibration pattern 1000 is displayed on the screen 100 of the slave device.

The camera 101 starts acquiring a flow of images including the pattern. The video flow is displayed on the auxiliary screen 102 to provide a visual feedback to the user.

The master computer detects the position of the pattern in screen-space coordinates (pixels). Then, it computes the approximate area, in squared pixels, of the detected pattern to estimate its distance (if camera 101 is a RGB-depth camera, a distance measurement may be directly available). If the estimated distance is lower than a first threshold, the pattern is considered to be "near" the camera and a first command is sent to the slave device; if the estimated distance is higher than a second threshold, the pattern is considered to be "far" from the camera and a second command is sent to the slave device; otherwise, the pattern is considered to be at an "intermediate" distance from the camera and a third command is sent to the slave device.

If the slave device receives the first command, indicating that its screen 100 is near to the camera, it makes said screen display the finest possible pattern, i.e. the one with the smallest features and the smallest spatial period. The master program running on the master computer 103 analyzes the video stream to determine if the pattern is detectable; if not, it sends a command to the slave indicating that a coarser pattern—i.e. one with larger features and spatial period—has to be displayed. Otherwise stated, the slave device shows progressively coarser patterns until the master computer is able to detect one of them. An image of the last pattern is then saved for calibration. Otherwise stated, the pattern adaptation is carried out iteratively.

Conversely, if the slave device receives the second command, indicating that its screen 100 is far from the camera, it makes said screen display the coarsest possible pattern, i.e. the one with the largest features and the largest spatial period. The master program running on the master computer 103 analyzes the video stream to determine if the pattern is detectable; if yes, it sends a command to the slave indicating that a finer pattern—i.e. one with smaller features and spatial period—may be displayed. Otherwise stated, the slave device shows progressively finer patterns until the master device fails at detecting one of them. An image of the last correctly detected pattern is then saved for calibration. As in the previously-considered case, the pattern adaptation is carried out iteratively.

If the slave device receives the third command, the pattern is not changed.

Moreover, the master computer may determine, by analyzing the video stream, that the pattern is not fully visible to the extent that its origin cannot be determined. In this case it sends a specific command to the slave device, which modifies the appearance of some elements of the pattern as explained above in reference to FIG. 6.

Each time an image of the calibration pattern suitable for calibration has been acquired, the user is informed e.g. via the auxiliary screen or a vibration of the slave device. Then, the user changes the position of the screen 100 displaying the calibration pattern.

When enough data has been collected (i.e. when the amount of collected data is sufficient to perform calibration with a predetermined accuracy level), the master computer computes the camera calibration parameters using e.g. Zhang's algorithm. Advantageously, the lens distortion can be estimated separately, by grabbing images when the pattern is close enough to the camera to fill the entire image space. The pattern could then be adjusted to be aligned with the axes of the auxiliary screen so that it appears as regular as possible.

It may happen that the master computer is unable to detect the pattern in the video stream, e.g. because it is too far or too close to the camera, or simply out of the camera view. To make the detection easier, it is possible to proceed as follows:

If no pattern is found, the master computer sends a command to the slave to modify the pattern.

The pattern then changes to a "high detectability mode".

If the pattern is still not detected in this mode, the user is encouraged to start moving the pattern slowly until it gets detected.

The "high detectability" pattern may simply consists in turning the whole screen white, or blinking between black and white, to ease detection by the calibration program (simple difference between two successive frames), or a simple geometrical pattern comprising e.g. three squares at the corners of the screen, blinking or not.

In a particular embodiment, the slave device 104 may be provided with sensors such as gyroscopes, accelerometers, magnetic compasses, allowing a measurement of the orientation of the device. The measurement results may be communicated to the master computer to improve the accuracy of the calibration, as only the position of the pattern would need to be computed.

The slave device could have a camera of its own, and, if it has already been calibrated, could use image processing (e.g. tracking of Augmented Reality markers) to enrich the calibration data with its position and orientation.

Quite often the camera is required to remain unchanged during the entire calibration process (no autofocus, no automatic brightness adjustment). The master computer can then send to the slave device commands to make the pattern brighter or dimmer to adapt to the current lighting conditions and ease its detection.

As it has been mentioned above, a same computer may serve as both the "master" and the "slave", in which case screens 100 and 102 and camera 101 are simply peripheral devices of this computer. The advantage of such an approach is that no handshaking is necessary.

Figure 7:
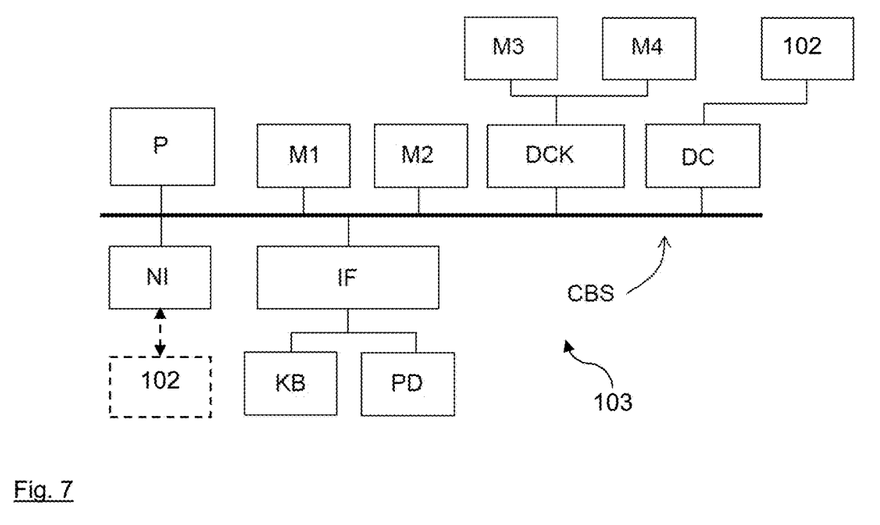
FIG. 7, a block diagram of a computer system suitable for carrying out a method according to an embodiment of the invention.

The internal structure of a master computer 103 suitable for carrying out a method according to an exemplary embodiment of the present invention is described with reference to FIG. 7. In FIG. 7, the computer 103 includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Data defining a plurality of calibration patterns (1000, 1001, 1002, 1003 on FIGS. 1-6), or a single "master" pattern from which different calibration patterns—e.g. of different spatial resolutions—may be obtained, are stored on one or more of memory devices M1 to M4, or remotely.

The claimed invention is not limited by the form of the computer-readable media on which the computer-readable instructions and/or the calibration pattern(s) are stored. For example, they can be stored on CDs, DVDs, in FLASH memory, RAM, ROM, PROM, EPROM, EEPROM, hard disk or any other information processing device with which the computer aided design station communicates, such as a server or computer. The program and the calibration pattern(s) can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 7 also includes a network interface NI, such as an Intel Ethernet PRO network interface card from Intel Corporation of America, for interfacing with a network, such as a local area network (LAN), wide area network (WAN), the Internet and the like. In the specific embodiment considered here, communication with the screen 100 used to display the calibration patterns is performed through the network.

The computer aided design station further includes a display controller DC, such as a NVIDIA GeForce GTX graphics adaptor from NVIDIA Corporation of America for interfacing with the auxiliary screen or display 102, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface. All these components are connected to each other through communication bus CBS, which can be an ISA, EISA, VESA, PCI, or similar. Moreover, the camera CAM to be calibrated is also connected to the bus CBS, in order to provide a video stream to the CPU P, which processes it as explained above.

A description of the general features and functionality of the display, keyboard, pointing device, as well as the display controller, disk controller, network interface and I/O interface is omitted herein for brevity as these features are known.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of calibrating a camera, comprising the steps of:
   a. making a video screen display a calibration pattern wherein the calibration pattern is formed by periodic arrangements of elements and characterized by at least an element size and a spatial period;
   b. acquiring from the camera a video stream of a scene comprising said video screen displaying said calibration pattern;
   c. modifying the calibration pattern displayed on the video screen depending on the acquired video stream, the modifying comprising the sub-steps of:
      c-i. determining, from said acquired video stream, an estimated distance between the camera and the video screen displaying the calibration pattern; then
         if the estimated distance is greater than a threshold:
      c-ii. making the screen display a pattern characterized by a largest element size and a largest spatial period; and
      c-iii. making the screen display successively patterns of decreasing element size and spatial period until one of the successive patterns is not detectable;
         if the estimated distance is lower than a threshold:
      c-iv. making the screen display a pattern characterized by a smallest element size and a smallest spatial period;
      c-v. checking whether said pattern is detectable; and
      c-vi. if not, making the screen display successively patterns of increasing element size and spatial period until one of the successive patterns is detectable;
   said steps a. to c. being iterated a plurality of times; and then
   d. when enough data has been collected, estimating intrinsic calibration parameters of the camera by processing the acquired video streams.

2. The computer-implemented method of claim 1, wherein step c. comprises:
   modifying the calibration pattern as a function of said estimated distance.

3. The computer-implemented method of claim 2 wherein said estimated distance between the camera and the video screen displaying the calibration pattern is determined by computing an area of the calibration pattern in a video sequence and deducing the estimated distance from said area.

4. The computer-implemented method of claim 1 wherein said element size is smaller than said spatial period, and wherein step c. comprises:
   iteratively modifying said calibration pattern to minimize said spatial period under a constraint of detectability of the pattern in the video stream.

5. The computer-implemented method of claim 1, further comprising a step of determining if an image of the calibration pattern is detectable in the video stream and, if not, making the screen display a specific pattern, different and more easily detectable than a calibration pattern.

6. The computer-implemented method of claim 1, further comprising a step of determining if only part of the calibration pattern is visible in the video stream and, in this case, modifying said pattern by introducing a plurality of pattern elements each having an appearance different from an appearance of any other pattern element of the calibration pattern.

7. The computer-implemented method of claim 1, further comprising a step of making an auxiliary screen display the acquired video stream.

8. A computer program product comprising:
   a computer-readable non-transitory data-storage medium; and
   computer-executable instructions embodying camera calibration and stored on the non-transitory computer-readable data-storage medium, the computer-executable instructions including instructions that cause a computer system to:
   a. make a video screen display a calibration pattern, wherein the calibration pattern is formed by periodic arrangements of elements and characterized by at least an element size and a spatial period;
   b. acquire from a camera a video stream of a scene comprising said video screen displaying said calibration pattern;
   c. modify the calibration pattern displayed on the video screen depending on the acquired video stream, the modifying comprising the sub-steps of:
      c-i. determining, from said acquired video stream, an estimated distance between the camera and the video screen displaying the calibration pattern; then
         if the estimated distance is greater than a threshold:
      c-ii. making the screen display a pattern characterized by a largest element size and a largest spatial period; and
      c-iii. making the screen display successively patterns of decreasing element size and spatial period until one of the successive patterns is not detectable;
         if the estimated distance is lower than a threshold:
      c-iv. making the screen display a pattern characterized by a smallest element size and a smallest spatial period;
      c-v. checking whether said pattern is detectable; and c-vi. if not, making the screen display successively patterns of increasing element size and spatial period until one of the successive patterns is detectable;
d. said steps a. to c. being iterated a plurality of times; and then
e. when enough data has been collected, estimate intrinsic calibration parameters of the camera by processing the acquired video streams and resulting in calibrating the camera.

9. A non-transitory computer-readable data-storage medium comprising:
memory holding computer-executable instructions that cause a computer system to calibrate a camera by:
a. making a video screen display a calibration pattern, wherein the calibration pattern is formed by periodic arrangements of elements and characterized by at least an element size and a spatial period;
b. acquiring from the camera a video stream of a scene comprising said video screen displaying said calibration pattern;
c. modifying the calibration pattern displayed on the video screen depending on the acquired video stream, the modifying comprising the sub-steps of:
c-i. determining, from said acquired video stream, an estimated distance between the camera and the video screen displaying the calibration pattern; then
if the estimated distance is greater than a threshold:
c-ii. making the screen display a pattern characterized by a largest element size and a largest spatial period; and
c-iii. making the screen display successively patterns of decreasing element size and spatial period until one of the successive patterns is not detectable;
if the estimated distance is lower than a threshold:
c-iv. making the screen display a pattern characterized by a smallest element size and a smallest spatial period;
c-v. checking whether said pattern is detectable; and
c-vi. if not, making the screen display successively patterns of increasing element size and spatial period until one of the successive patterns is detectable;
said steps a. to c. being iterated a plurality of times; and then
d. when enough data has been collected, estimating intrinsic calibration parameters of the camera by processing the acquired video streams.

10. A computer system comprising:
a processor coupled to a memory and a graphical user interface, the memory storing computer-executable instructions that cause the computer system to:
a. make a video screen display a calibration pattern, wherein the calibration pattern is formed by periodic arrangements of elements and characterized by at least an element size and a spatial period;
b. acquire from a subject camera a video stream of a scene comprising said video screen displaying said calibration pattern;
c. modify the calibration pattern displayed on the video screen depending on the acquired video stream, the modifying comprising the sub-steps of:
c-i. determining, from said acquired video stream, an estimated distance between the camera and the video screen displaying the calibration pattern; then
if the estimated distance is greater than a threshold:
c-ii. making the screen display a pattern characterized by a largest element size and a largest spatial period; and
c-iii. making the screen display successively patterns of decreasing element size and spatial period until one of the successive patterns is not detectable;
if the estimated distance is lower than a threshold:
c-iv. making the screen display a pattern characterized by a smallest element size and a smallest spatial period;
c-v. checking whether said pattern is detectable; and
c-vi. if not, making the screen display successively patterns of increasing element size and spatial period until one of the successive patterns is detectable;
said steps a. to c. being iterated a plurality of times; and then
d. when enough data has been collected, estimate intrinsic calibration parameters of the camera by processing the acquired video streams, and calibrate the camera.

11. The computer system as claimed in claim 10 wherein the computer system modifying the calibration pattern comprises:
modifying the calibration pattern as a function of said estimated distance.

12. The computer system as claimed in claim 11 wherein said estimated distance between the camera and the video screen displaying the calibration pattern is determined by computing an area of the calibration pattern in a video sequence and deducing the estimated distance from said area.

13. The computer system as claimed in claim 10 wherein said element size is smaller than said spatial period, and wherein modifying the calibration pattern comprises the computer system:
iteratively modifying said calibration pattern to minimize said spatial period under a constraint of detectability of the pattern in the video stream.

14. The computer system as claimed in claim 10, wherein the computer-executable instructions further cause the computer system to determine if an image of the calibration pattern is detectable in the video stream and, if not, make the screen display a specific pattern, different and more easily detectable than a calibration pattern.

15. The computer system as claimed in claim 10, wherein the computer-executable instructions further cause the computer system to determine if only part of the calibration pattern is visible in the video stream and, in this case, modify said pattern by introducing a plurality of pattern elements each having an appearance different from an appearance of any other pattern element of the calibration pattern.

16. The computer system as claimed in claim 10, wherein the computer-executable instructions further cause the computer system to make an auxiliary screen display the acquired video stream.

* * * * *